United States Patent [19]

Yamagata

[11] Patent Number: 6,021,222
[45] Date of Patent: Feb. 1, 2000

[54] SYSTEM AND METHOD FOR THE DETECTION OF A CIRCLE IMAGE FOR PATTERN RECOGNITION

[75] Inventor: Hideaki Yamagata, Yokohama, Japan

[73] Assignee: Ricoh Co., Ltd., Japan

[21] Appl. No.: 09/004,663

[22] Filed: Jan. 8, 1998

Related U.S. Application Data

[63] Continuation of application No. 08/291,707, Aug. 16, 1994, abandoned.

[51] Int. Cl.[7] .................................................. G06K 9/46
[52] U.S. Cl. ............................................ 382/199; 382/203
[58] Field of Search .................................... 382/199, 203, 382/266, 197

[56] References Cited

U.S. PATENT DOCUMENTS

| 4,644,583 | 2/1987 | Watanabe et al. | 382/199 |
| 4,969,201 | 11/1990 | Takasaki et al. | 382/203 |
| 5,339,367 | 8/1994 | Roth | 382/199 |
| 5,568,567 | 10/1996 | Yokoyama | 382/203 |

OTHER PUBLICATIONS

Levine. "Vision in Man and Machine." McGraw–Hill, pp. 518–526, 1985.
Cao et al. "An Efficient Method for Multiple Circle Detection." 3rd Int. Conf. on Computer Vision, pp. 744–747, Dec. 1990.
Leung et al. "Detecting Wheels of Vehicle in Stereo Images." 10th Int. Conf. on Pattern Recognition, vol. 1, pp. 263–267, Jun. 1990.
Gonzalez et al. "Digital Image Processing." Addison–Wesley, pp. 416–429, 1992.
Pitas. "Digital Image Processing Algorithms." Prentice Hall, pp. 223–253, 1995.
Haralick et al. "Computer and Robot Vision." Addison–Wesley, vol. 1, pp. 578–585, 1992.

*Primary Examiner*—Jon Chang
*Attorney, Agent, or Firm*—Knoble & Yoshida LLC

[57] ABSTRACT

The present invention generally relates to pattern recognition systems, and particularly to the detection of a circle from a complex image that combines circles, straight lines, and other shapes. The system of the invention determines whether a pixel in an image being scanned is an edge pixel, and derives a gradient vector associated with the edge pixel. The direction of the gradient vector is modified toward a center of a circle incorporating the edge pixel, and then whether the edge pixel is a circle edge pixel is determined. If the edge pixel is a circle edge pixel, coordinates of a center of a circle for the edge pixel are calculated, and stored in memory. After the above steps are repeated for the other pixels in the image being scanned, the system determines whether coordinates of a calculated center of a circle for any circle edge pixel are the same for other circle edge pixels. If so, a circle is considered to be detected based on the circle edge pixels having calculated centers within a predetermined range of each other and within a predetermined frequency of occurrence.

15 Claims, 8 Drawing Sheets

FIG. 4A area A

| 133 | 134 | 132 | 133 | 133 | 135 | 132 | 133 | 134 |
|---|---|---|---|---|---|---|---|---|
| 124 | 125 | 124 | 125 | 125 | 124 | 125 | 125 | 124 |
| 85 | 84 | 85 | 85 | 85 | 84 | 85 | 85 | 85 |
| 46 | 46 | 46 | 45 | 46 | 45 | 45 | 46 | 46 |
| 37 | 38 | 37 | 37 | 38 | 37 | 38 | 37 | 38 |

Center pixel of area A

14a area B

| 27 | 32 | 34 | 36 | 37 | 35 | 34 | 30 | 26 |
|---|---|---|---|---|---|---|---|---|
| 35 | 40 | 43 | 45 | 46 | 44 | 42 | 39 | 34 |
| 73 | 78 | 81 | 83 | 85 | 84 | 80 | 79 | 72 |
| 111 | 118 | 120 | 123 | 125 | 124 | 121 | 117 | 112 |
| 145 | 135 | 129 | 127 | 125 | 126 | 130 | 135 | 144 |

Center pixel of area B

14c area C

| 111 | 115 | 120 | 123 | 125 | 124 | 121 | 117 | 112 |
|---|---|---|---|---|---|---|---|---|
| 145 | 135 | 129 | 127 | 125 | 126 | 130 | 135 | 144 |
| 100 | 94 | 89 | 86 | 86 | 86 | 90 | 93 | 101 |
| 60 | 55 | 51 | 47 | 46 | 48 | 50 | 54 | 60 |
| 52 | 47 | 42 | 40 | 38 | 41 | 43 | 46 | 51 |

Center pixel of area C

SYSTEM AND METHOD FOR THE DETECTION OF A CIRCLE IMAGE FOR PATTERN RECOGNITION

This Application is a continuation of Application Ser. No. 08/291,707 filed Aug. 16, 1994, now abandoned.

BACKGROUND OF THE INVENTION

1. Field of the Invention

The present invention generally relates to pattern recognition systems, and particularly to the detection of a circle from a complex image that combines circles, straight lines, and other shapes.

2. Related Art

The science of digital image processing involves the transformation of an image into digital data to be processed by a digital computer. Digital image analysis concerns the description and interpretation of that digital data in order to recognize the content of the image that was transformed.

Digital image processing and consequently digital image analysis first begin with the process of forming the digital image. Typically, a system or device for forming digital images includes an optical system, a sensor, and a digitizer. The optical system typically scans an object or image to create optical signals. The sensor in turn detects those optical signals and converts them into analog electrical signals. The digitizer then converts those analog electrical signals into digital signals that represent the original object or image.

Digital image analysis generally begins with determining the boundaries of an object by detecting the edges and lines which define the image of the object. Once the boundaries are detected, coordinates for those boundaries are generated. The present invention primarily concerns the process for determining object boundaries based the detection of edges.

In *Digital Image Processing Algorithms* by Ioannis Pitas, Prentice Hall International (UK) Ltd., Prentice Hall Incorporated, Englewood Cliffs, N.J. 1993, p. 223, which is incorporated by reference herein, an image edge is generally defined as the border between two homogeneous image regions having different illumination intensities. In other words, an image edge is defined by local variations of illumination or intensity. Therefore, image edges may be detected by applying known methods for determining local illumination or intensity differences. One such technique uses a Sobel operator or Sobel edge detector mask, which will be applied in the present invention. For the purposes of the invention, edge pixels are defined as the pixels along the border between two image regions of different intensities. The difference between the intensity of pixels in one region on one side of the edge pixels and the intensity of pixels in the other region on the other side of the edge pixels is a relative maximum.

Local image intensity variations can be described in terms of image gradients such as:

$$\nabla M(x,y) = [\delta M/\delta x \ \delta M/\delta y]^T \triangleq [M_x M_y]^T$$

where $\nabla M(x,y)$ represents the image gradient for an individual pixel. A gradient vector may then be calculated for the individual pixel in terms of its magnitude $M(x,y)$ and direction $D(x,y)$ where $$M(x, y) = \sqrt{M_x(x, y)^2 + M_y(x, y)^2}$$

$$D(x, y) = \arctan\left(\frac{M_x(x, y)}{M_y(x, y)}\right)$$

The Sobel operator or edge detection mask is a matrix pattern of values (See FIG. 5B) that is applied to a matrix representing the intensity values of a selected image pixel and the neighborhood of pixels surrounding the selected pixel. When the Sobel operator is applied, a gradient vector for that selected pixel may be calculated.

In digital image analysis, the conventional approach for detecting a circle in a complex image is the Hough Transformation. The Hough Transformation is a method for detecting straight lines and curves on grey level images, as defined in *Computer and Robot Vision—Volume I*, Addison-Wesley Publishing Company, Reading, Mass. 1992, pp. 578–585 by Haralick et al. This book by Haralick et al. is hereby incorporated by reference.

Even though the Hough Transformation is widely used, there are problems in its application. One such problem is in determining the threshold levels for assigning values to the accumulator array used by the transformation. For example, if the threshold levels for inputting values into the accumulator array are too low, the transformation generates too many values some of which may be erroneous. If the threshold levels are too high, the transformation cannot generate enough values to detect a circle.

The detection and recognition of a circle is particularly significant in the imaging analysis of objects containing identifying marks based on a circle. For example, confidential documents are often marked or stamped to indicate their status. That confidential status in many cases requires that the documents not be copied without proper authorization. However, current methods for preventing unauthorized copying of documents only include having the documents made with colors and/or materials that cannot be copied, denying anyone handling the documents access to a copier, or denying access to the documents completely. Such methods clearly are inefficient and can be expensive.

One possible application of the invention is the detection of the mark or stamp on a document that indicates its confidential status. In this case, the mark or stamp includes a circular border, such as that shown in FIG. 3, Image 0. An image processing apparatus (e.g., a photocopier, a facsimile machine) can be designed to detect such a mark on a document it is handling, and to stop the copying or transmission of the document, or to warn of the unauthorized copying or transmission if it detects such a mark.

In this application, the invention has the advantage of not requiring any special materials that may be awkward or costly to use. Rather, conventional paper or its equivalent can be used as long as the documents are marked properly. Also, the invention eliminates the need for any special handling procedures that are inefficient or time-consuming. Image processing apparatus equipped with the invention would simply prevent unauthorized copying or transmission of the documents.

SUMMARY OF THE INVENTION

One main object of the present invention is to provide a system that in the application of detecting confidential or security marks, can prevent unauthorized copying or transmission of documents. At the same time, the system eliminates the need for inefficient and/or costly procedures and materials.

Another main object of the present invention is to overcome the problems and disadvantages with using a conventional Hough Transformation to detect circle images in an image analyzing or pattern recognition system.

Consequently, another object of the present invention is to provide a system for detecting circle images by detecting inner edge pixels of the circle image to generate a gradient vector of the pixel, and by modifying and aligning the gradient vector with the center of the circle image.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Figure 1:
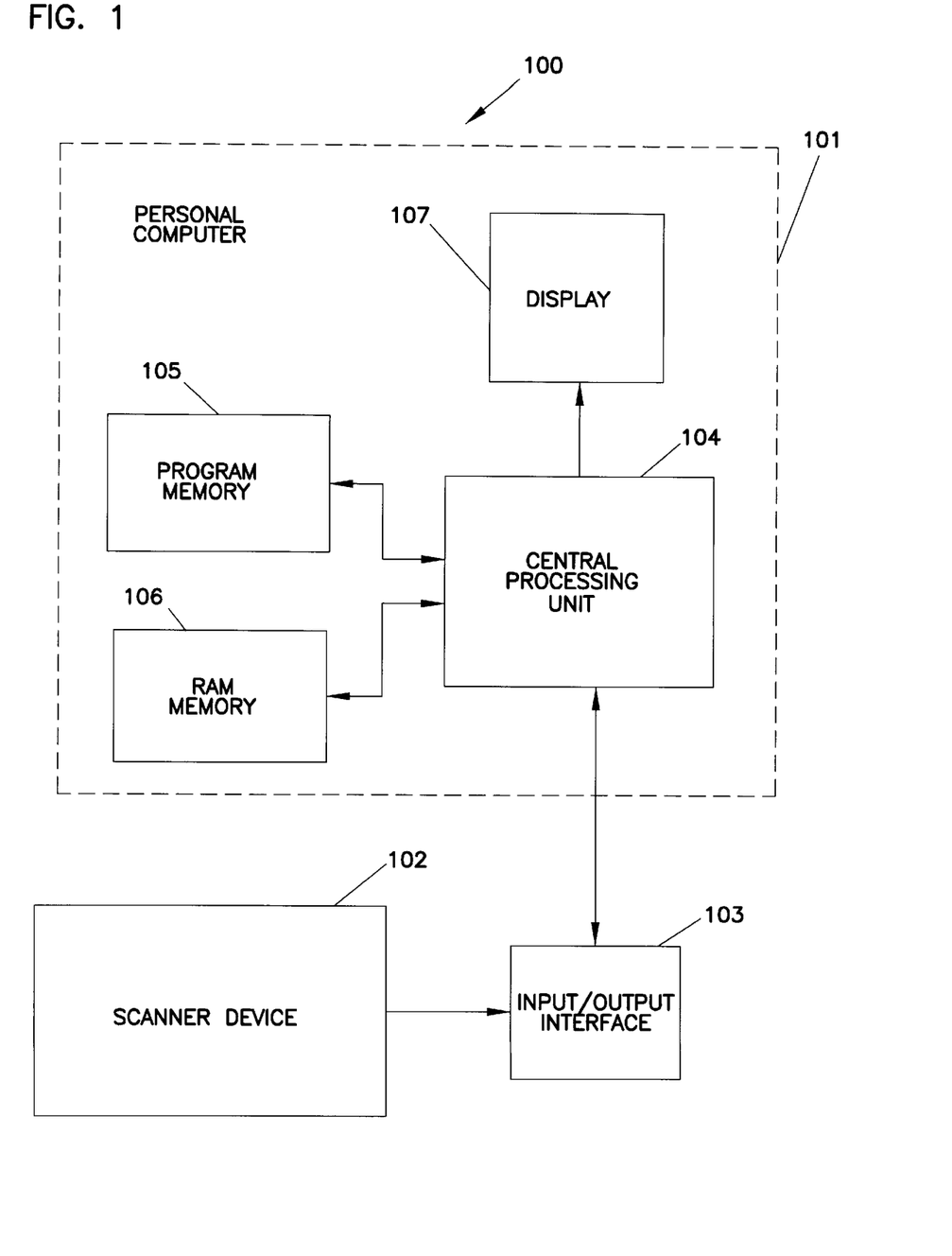
FIG. 1 illustrates a general system block diagram of a computer-based system for implementing the present invention.

In a first preferred embodiment, the present invention is implemented by software in a system comprising a structure as shown in FIG. 1. As shown, the system 100 generally incorporates a personal computer (PC) 101, a scanner device 102, and an input/output (I/O) interface 103 connecting the scanner device 102 to the PC 101. The PC 101 includes a central processing unit (CPU) 104, program memory 105, RAM memory 106, and a display 107.

In operation, the PC 101 controls the operation of the scanner device 102 such that the scanner device 102 generates image data signals representative of an object or image it is scanning. The image data signals are then inputted into the PC 101 for processing through the present invention.

Figure 2:
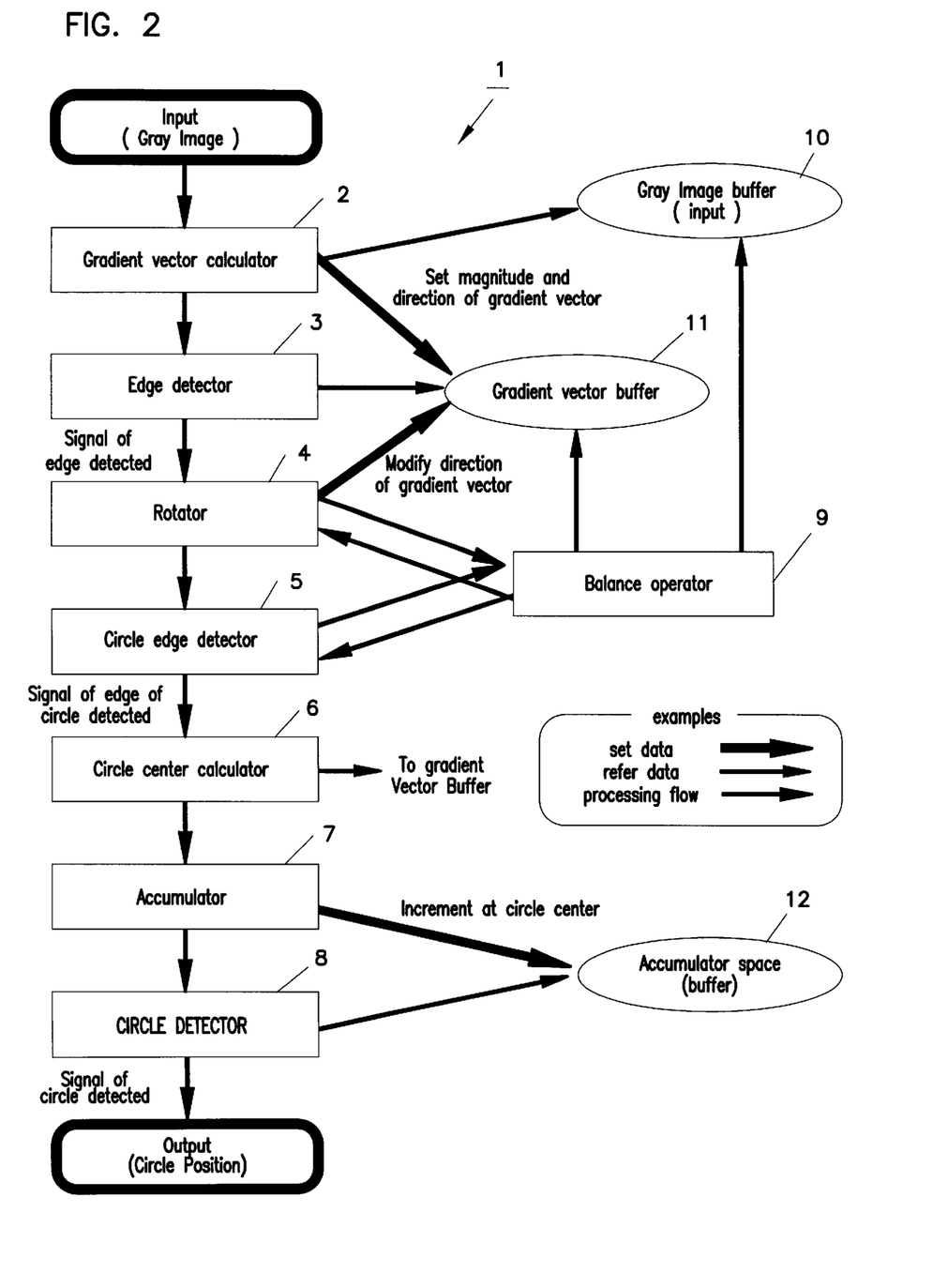
FIG. 2 illustrates a block diagram of the different operations and elements of the present invention.

As shown in FIG. 2, a system 1 of the present invention incorporates the main elements of a gradient vector calculator 2, an edge detector 3, a rotator 4, a circle edge detector 5, a circle center calculator 6, an accumulator 7, and a circle detector 8. Also, the system 1 includes several sub-elements which are accessed by the various main elements. Specifically, the sub-elements are the balance operator 9, the gray image buffer 10, the gradient vector buffer 11, and the accumulator buffer 12.

Figure 5A:
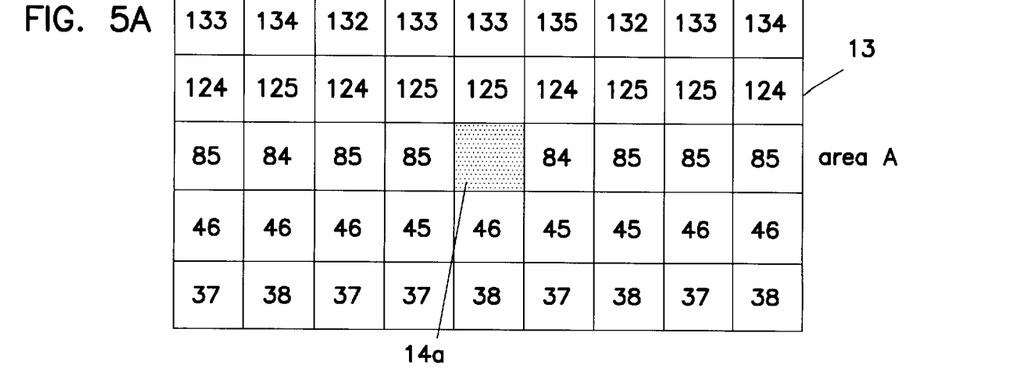
FIG. 5A shows the matrix of the neighborhood of pixels designated area A to be used as an example.
Figure 5B:
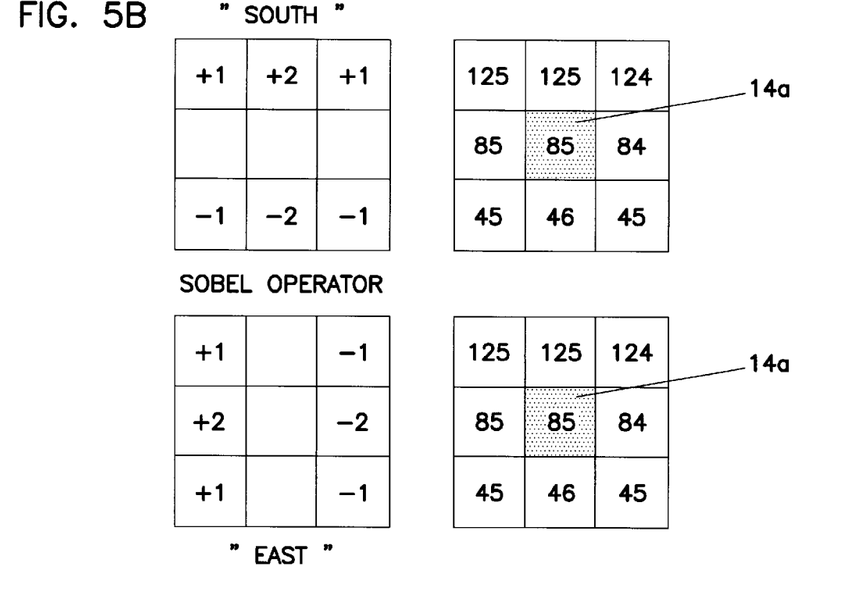
FIG. 5B shows the 3×3 matrix out of the neighborhood of pixels of area A to be applied with the Sobel operator.

The gradient vector calculator 2 implements the Sobel operator to calculate the gradient vector for a given image pixel. As described earlier, the calculated gradient vector is expressed in terms of its magnitude M(x,y) and direction D(x,y). In this embodiment, the Sobel operator is applied in two orthogonal directions to the intensity values of the selected image pixel and of the neighborhood of pixels surrounding the selected pixel as shown in FIG. 5B. The two orthogonal directions represent the positive directions in a coordinate system describing the scanned image. In the embodiments to be described, the Sobel operator uses the "east" (right) and "south" (down) directions as the positive directions in a coordinate system. The magnitude and direction of the calculated gradient are expressed as follows:

$$M(x, y) = \sqrt{M_s(x, y)^2 + M_e(x, y)^2}$$

$$D(x, y) = \arctan\left(\frac{M_s(x, y)}{M_e(x, y)}\right)$$

Alternatively, the Sobel operator may use the "north" (up) and the "west" (left) directions as the positive directions. In this alternative coordinate system, the signs +/− of the gradient vector components and/or the direction D(x,y) are the reverse of the system using the "east" and "south" directions.

Figure 4A:
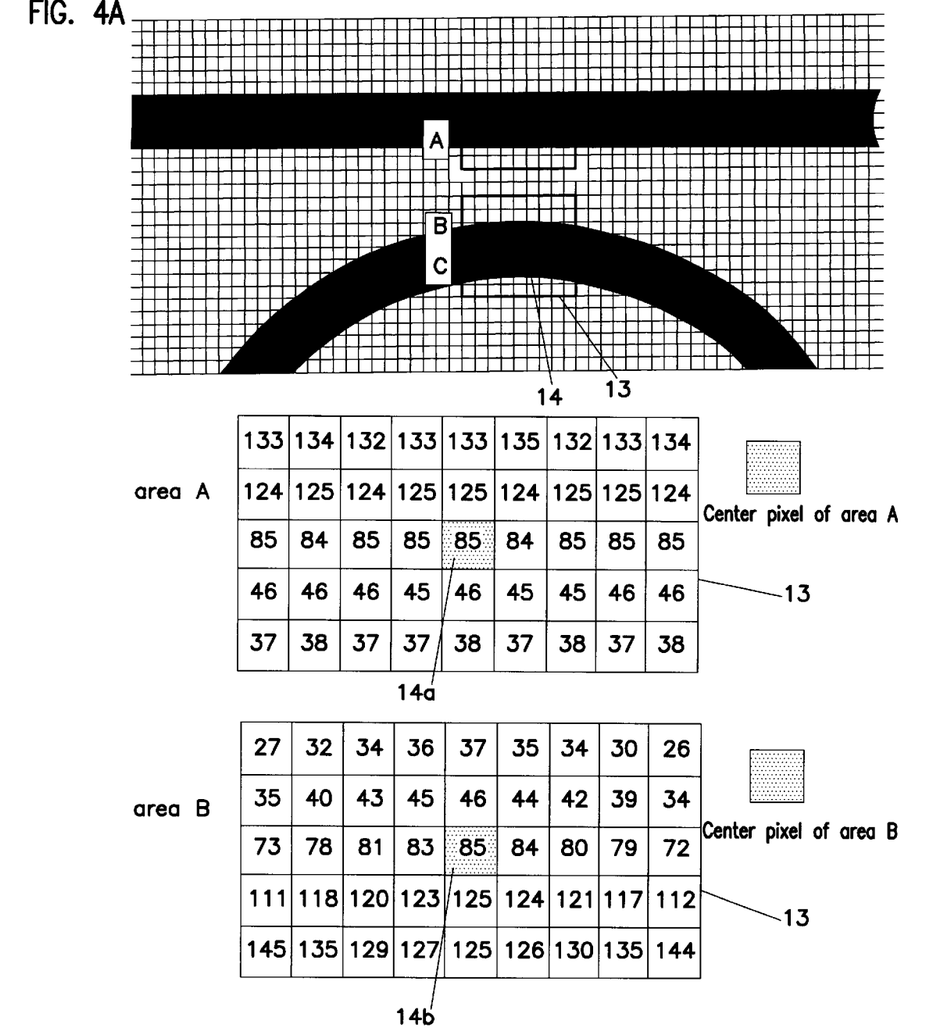
FIG. 4A shows the location of neighborhoods of pixels relative to an image being scanned.
Figure 4B:
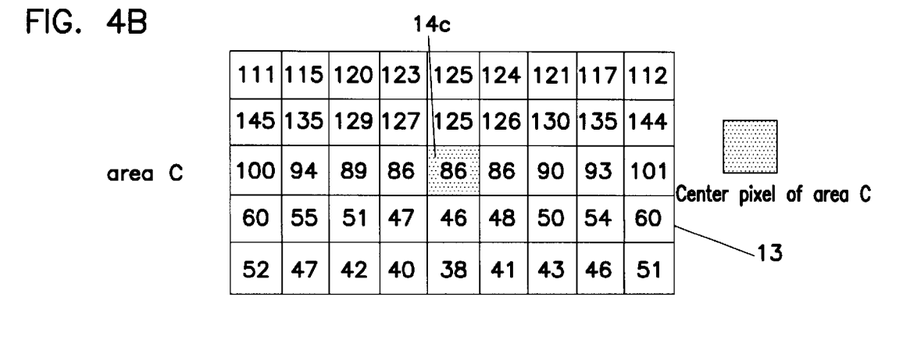
FIG. 4B shows the neighborhoods of pixels from FIG. 4A represented as matrices of their illumination intensities.
Figure 8A:
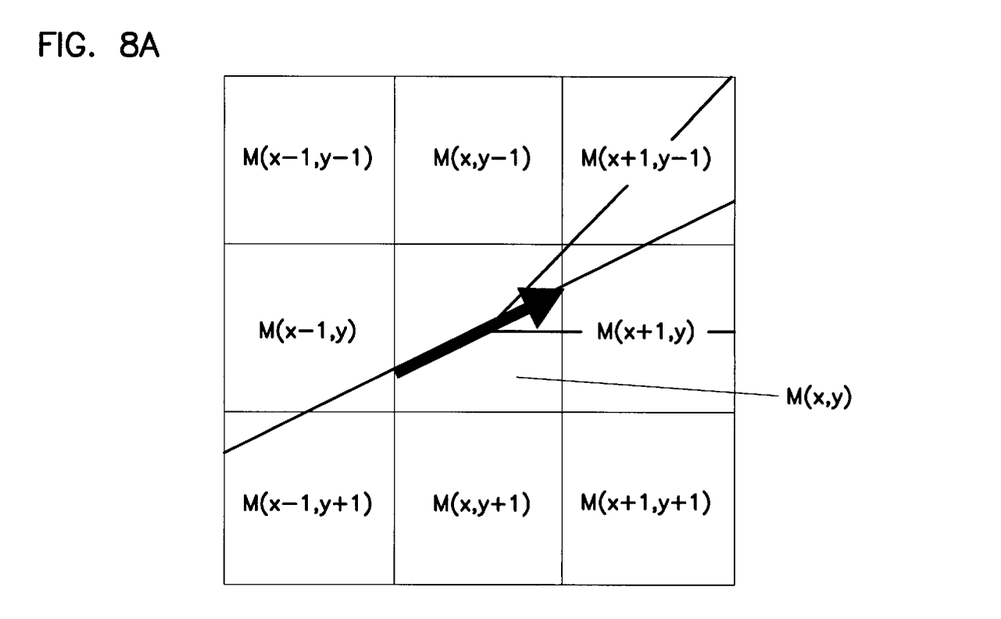
FIG. 8A illustrates the how to calculate whether a pixel is a local maximum.
Figure 8B:
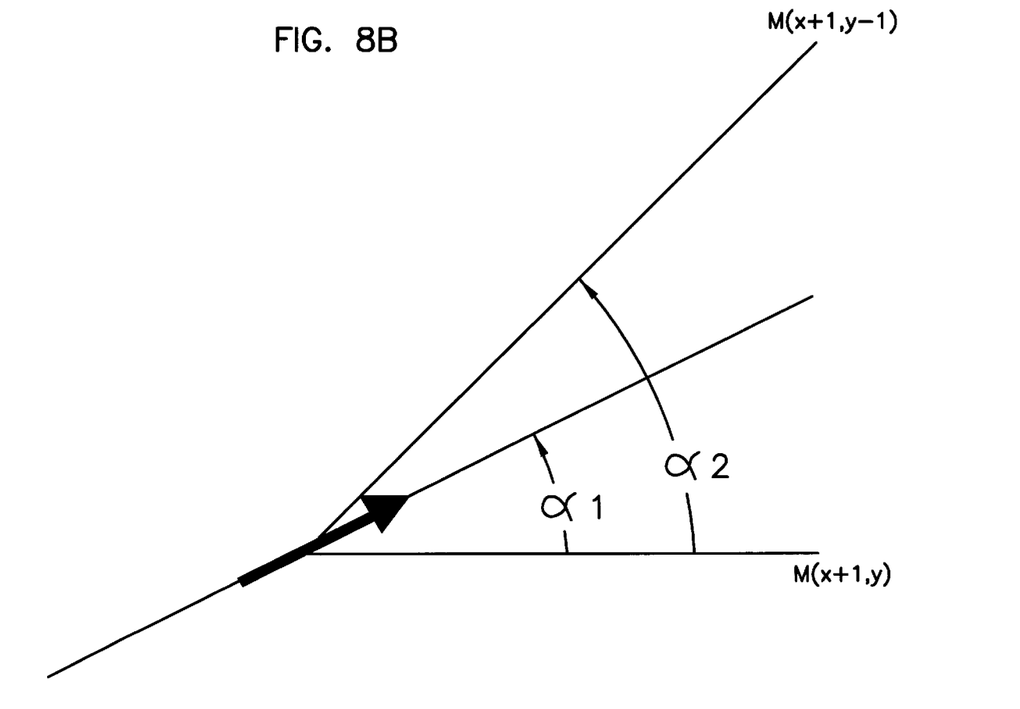
FIG. 8B shows the relationship of angles used in calculating whether a pixel is a local maximum as shown in FIG. 8A.

Based on the above definition of an edge pixel, the edge detector 3 determines if an image pixel is an edge pixel. In one method for doing so, the edge detector 3 calculates the difference between the intensity values of pixels in one image region with those of pixels in the other image region. As shown in FIGS. 4A and 4B, the pixels from which the difference in intensity is calculated are from a neighborhood of pixels 13 surrounding the given image pixel. The given image pixel is defined as the center pixel 14 of that neighborhood 13. In this embodiment, the difference in intensity between a pixel in front of a given image pixel and a pixel behind the given image pixel, relative to the direction of the given image pixel's gradient vector, is determined as shown in FIGS. 8A–8B and as follows:

$$Mf=[M(x+1,y)\times((\alpha 2-\alpha 1)/\alpha 2)]+[M(x+1,y-1)\times(\alpha 1/\alpha 2)]$$

$$Mb=[M(x-1,y)\times((\alpha 1-\alpha 2)/\alpha 2)]+[M(x-1,y+1)\times(\alpha 1/\alpha 2)]$$

Mf is the intensity of a pixel "in front of" the given image pixel relative to the gradient vector of the given image pixel.

Mb is the intensity of a pixel "behind" the given image pixel. FIG. 8A illustrates the neighborhood of pixels surrounding an example image pixel based on their intensities represented by $M(x\pm1,y\pm1)$. FIG. 8B shows the relationship of the angles $\alpha1$ and $\alpha2$ with the gradient vector of the example image pixel.

The given image pixel $M(x,y)$ is determined to be a local maximum as follows:

If $Mf \leq M(x,y)$ and $Mb \leq M(x,y)$ then $M(x,y)$ is a local maximum.

As shown, if the difference in intensities is a local maximum relative to the neighborhood 13, then the given image pixel is considered an edge pixel. The edge detector 3 then signals the rotator that an edge pixel has been detected.

The rotator 4 activates whenever the edge detector 3 determines an edge pixel. The rotator 4 then accesses the balance operator 9 to determine how much the direction $D(x,y)$ of the edge pixel's gradient vector must be modified in order to balance the gradient vector towards the center of a hypothetical circle that includes the detected edge pixel. The rotator 4 then uses the calculation made by the balance operator 9 to adjust the direction $D(x,y)$ of the gradient vector based on the following modification functions:

$R(F(lx,ly),F(rx,ry)) = \gamma(F(lx,ly) - F(rx,ry))$ $Dm(x,y) = D(x,y) + R(F(lx,ly),F(rx,ry))$ R is defined as the rotation modification function. $F(lx,ly)$ and $F(rx,ry)$ are the calculated intensities of left and right side pixels, respectively, determined by the balance operator 9 as will be explained below. $\gamma$ is a modification constant that is determined experimentally. The value of $\gamma$ is based on the radius of the circle image to be detected, the width of the circle image line, and the color and the gray image level of the circle image. The value of $\gamma$ is inputted by a user prior to the operation of the system.

In this case, the value of $\gamma$ is 0.006 rad/intensity. $Dm(x,y)$ is the modified direction of the gradient vector.

The circle edge detector 5 detects circle edge pixels by determining whether an image pixel that was determined to be an edge pixel is also a circle edge pixel. To do so, the circle edge detector 5 accesses the balance operator 9 to determine the intensity values of left and right side pixels relative to the image pixel being examined. With the calculated values from the balance operator 9, the circle edge detector determines the differences in intensity values of each of the side pixels and the image pixel being examined as follows:

$\Delta l(x,y) = |F(lx,ly) - F(x,y)|$ $\Delta r(x,y) = |F(rx,ry) - F(x,y)|$ $\Delta s(x,y) = |F(lx,ly) - F(rx,ry)|$ $\Delta l$ is the difference in intensity between the left side pixel and the examined image pixel. $\Delta r$ is the difference in intensity between the right side pixel and the examined image pixel. $\Delta s$ is the difference between the left and right side pixels.

The circle edge detector 5 determines whether the image pixel being examined is a circle edge pixel when all three of the following conditions are satisfied:

$\Delta s < ThB$ $\Delta l > ThM$ $\Delta r > ThM$

ThB is a statistical threshold difference between the left and right side pixels calculated as follows:

$ThB = M\Delta sI + 3S\Delta sI$

The threshold differences are calculated based on an ideal circle image. An ideal or perfect circle image does not have any extraneous or noisy images, and its background is at an intensity level of 0. $M\Delta s$ is the mean of the difference in intensities between left and right side pixels $\Delta sI$ in the ideal circle image. $S\Delta sI$ is the standard deviation of the difference in intensities between left and right side pixels $\Delta sI$ in the ideal circle image. ThM is the statistical threshold difference between either the left side pixel and the image pixel being examined or the right side pixel and the image pixel. ThM is calculated as follows:

$ThM = M\Delta lrI - 3S\Delta lrI$ $M\Delta lrI$ is the mean of the difference in intensities between the left or right side pixel and a center pixel $\Delta lrI$ in the ideal circle image. $S\Delta lrI$ is the standard deviation of the difference in intensities between the left or right side pixel and the center pixel $\Delta lrI$ in the ideal circle image.

The circle center calculator 6 activates whenever the circle edge detector 5 finds an image pixel that satisfies the above conditions. The circle center calculator 6 then determines the coordinates of a center of a circle $Cx(x,y),Cy(x,y)$ relative to the image pixel as follows:

$Cx(x,y) = x + \delta \cos(Dm(x,y))$ $Cy(x,y) = y + \delta \sin(Dm(x,y))$ $\delta$ is the radius of a circle to be detected. The value of $\delta$ is selected by the user and inputted prior to the system's operation.

The accumulator 7 stores the coordinates of the centers of circles determined by the circle center calculator 6. In the accumulator 7, a parameter matrix is maintained which represents the entire image space which the system scans as a plurality of discrete points or pixels. Each pixel has values for its coordinates stored in the accumulator buffer 12 of the accumulator 7. In this case, the shape to be detected is a circle. As the image space is scanned pixel by pixel, the accumulator keeps track of the scanning of all the pixels in the image space and of the cumulative frequency of the calculated circle centers.

The circle detector 8 determines whether or not a circle is present based on the circle center data in the accumulator 7. The circle detector 8 extracts from the accumulator 7 the cumulative frequency $R(x,y)$ of a particular circle center $C(x,y)$ within a predetermined radius Rf and calculates the following:

If $(R(x,y) > ThF)$ then $R(x,y) \rightarrow$ Center of a Circle

The values of x and y are the coordinates of the circle center in the image space. ThF is the threshold frequency of occurrence of a set of coordinates. If the actual frequency of occurrence exceeds that threshold, a circle center is present in the image being scanned. If an actual circle center is detected, then the corresponding circle itself is also detected.

The balance operator 9 is a general operator system that is accessed by both the rotator 4 and the circle edge detector 5. The balance operator 9 balances the direction D(x,y) of the image pixel's gradient vector. The balance operator 9 first generates left and right side pixels which are defined along a line perpendicular to the gradient vector of the image pixel, and on both sides of the image pixel each at a predetermined distance β. The value of β is similarly based on the radius of the circle image to be detected, the width of the circle image line, and the color and the gray image level of the circle image. Its value is also inputted into the system prior to operation.

Figure 6A:
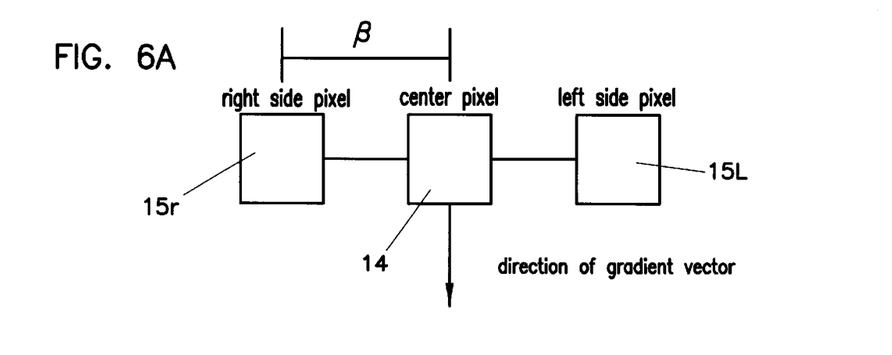
FIG. 6A shows the general position of the left and right side pixels relative to the center pixel.

The left and right side pixels 15l, 15r are illustrated. in FIG. 6A. As shown, the image pixel operated on is always defined as the center pixel 14 of a neighborhood 13. For an image pixel having a gradient vector with a direction D(x,y), the positions of the left and right side pixels 15l, 15r are calculated as follows:

lx=x+β sin (D(x,y))

ly=y+β cos (D(x,y))

rx=x−β sin (D(x,y))

ry=y−β cos (D(x,y))

Figure 6B:
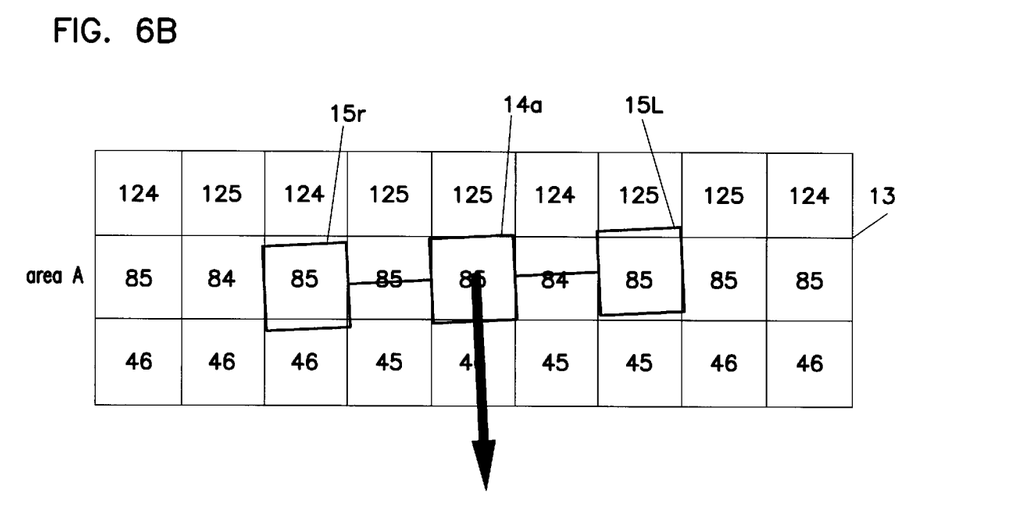
FIG. 6B shows the left and right side pixels relative to the neighborhood of pixels of area A.

The magnitudes for the left and right side pixels 15l, 15r, F(lx,ly) and F(rx,ry) respectively, are calculated based on the magnitudes of the pixels with which they would overlap in the neighborhood of the image pixel. FIG. 6B illustrates the image pixel, the left side pixel and the right side pixel superimposed over the neighborhood of pixels 13. For purposes of this stage of the invention's operation, only a 3×9 portion of the neighborhood needs to be shown. As shown, each of their magnitudes is equal to the sum of the magnitudes of each of the pixels they overlap times the fraction of the area of the pixel actually overlapped:

F(lx,ly)=Σ(lp$_n$×lM$_n$)

F(rx,ry)=Σ(rp$_n$×rM$_n$)

Figure 6C:
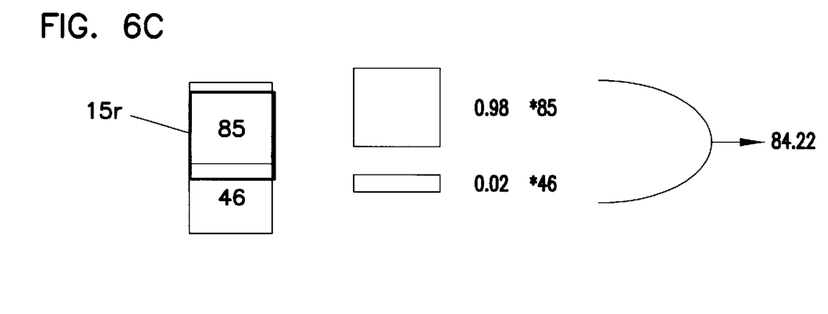
FIG. 6C illustrates how the intensity values of the left and right pixels are determined.

The variable p$_n$ is the fraction of the area of a pixel overlapped by either the left or right side pixel, M$_n$ is the corresponding magnitude of the overlapped pixel, and n is the number of pixels overlapped. FIG. 6C shows, as an example, how the intensity value of the right side pixel for the center pixel of area A is determined.

Figure 3:
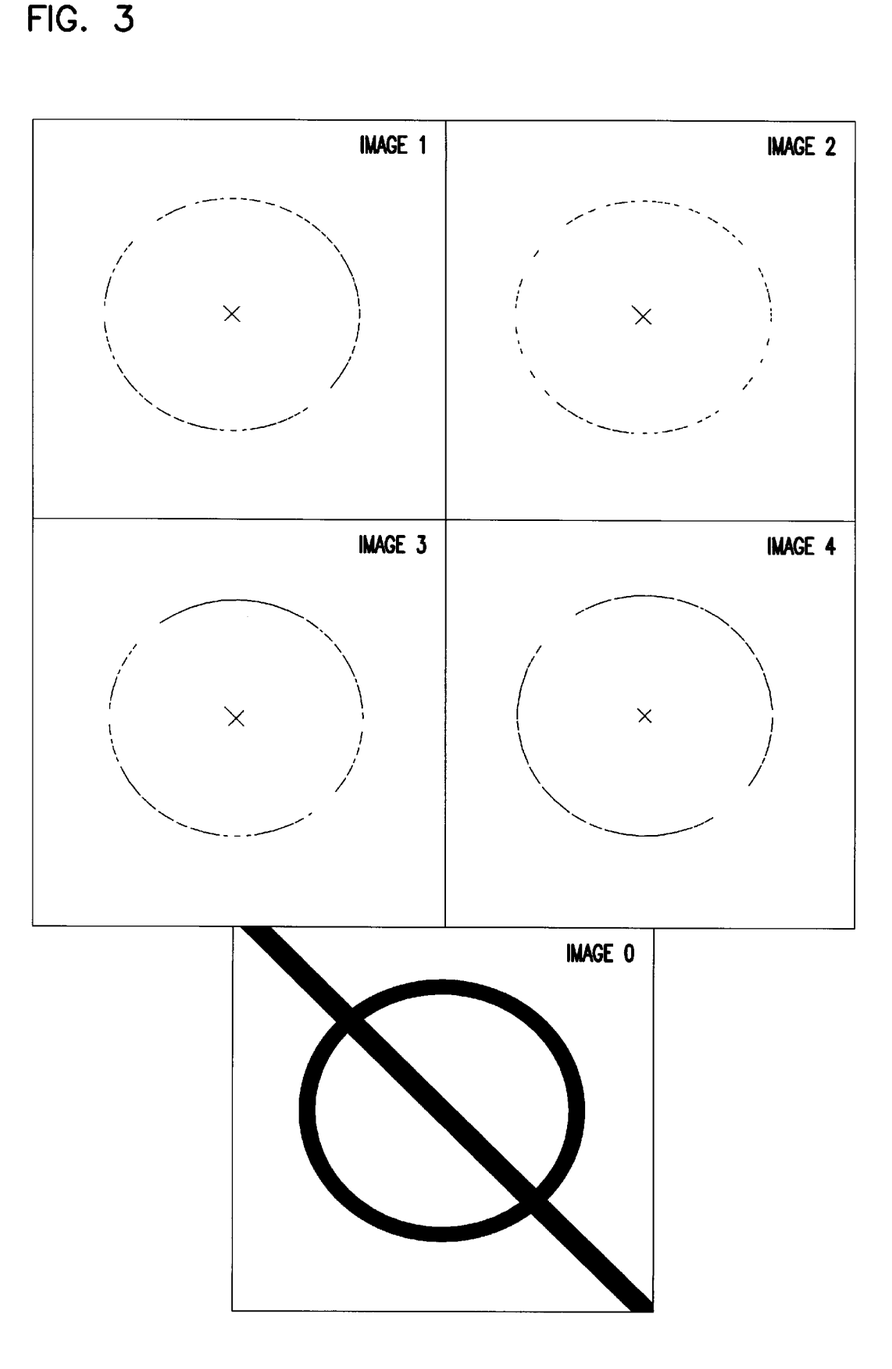
FIG. 3 shows a comparison of the original gray image with representations of that image determined by the different embodiments of the invention.

In operation, the present invention as illustrated in FIG. 2, receives a gray image as input image data. A gray image is a black-and-white image where different shades of gray provide contrast. In FIG. 3, Image 0 shows an example of a gray image of a circle. The input image data is stored in the gray image buffer 10. The gradient vector calculator 2 accesses the gray image buffer 10 and analyzes the pixels one at a time.

As shown in FIG. 4A, the gradient vector calculator 2 selects a pixel from the image space and designates it as the center pixel 14 for a predetermined neighborhood of pixels 13. In this case, the neighborhood 13 consists of a 5×9 matrix of pixels. Each pixel in the neighborhood is represented in the matrix by its intensity value. As an example, FIG. 4A shows three neighborhoods 13, areas A–C, in the image space being scanned, the center pixel 14 of each area being the selected pixel. In FIG. 4B, areas A–C are shown with each pixel represented in the matrix by their intensity values. The center pixels in each of areas A–C are designated by reference numerals 14a, 14b and 14c, respectively.

Figure 5C:
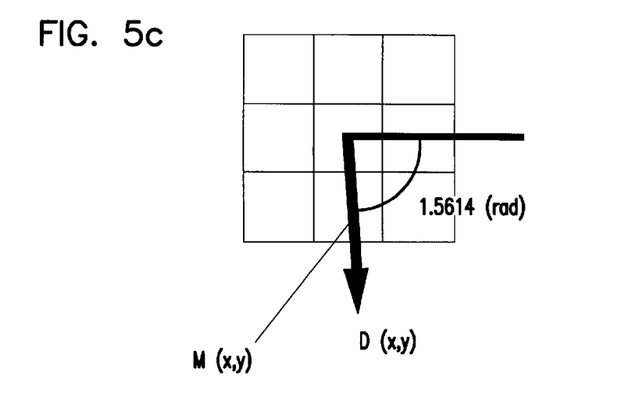
FIG. 5C illustrates the resulting gradient vector from the operation shown by FIG. 5B.

As noted above, FIGS. 5A–5C illustrate the operation of the gradient vector calculator 2 using area A as an example. As shown, a 3×3 Sobel operator is applied to a 3×3 matrix within the area A and with the center pixel 14a. In FIG. 5B, the Sobel operator is applied in the south (downward) and east (rightward) directions. FIG. 5C illustrates the resulting gradient vector determined for the center pixel 14a of area A. The gradient vectors for the center pixels 14a–14c in each of the areas A–C are as follows:

For center pixel 14a:

$$Ms(ax, ay) = \frac{125 + (2 \times 125) + 124 - 45 - (2 \times 46) - 45}{8}$$

$$= 39.63$$

$$Me(ax, ay) = \frac{125 + (2 \times 85) + 45 - 124 - (2 \times 84) - 45}{8}$$

$$= 0.37$$

$$M(ax, ay) = \sqrt{M_s(ax, ay)^2 + M_e(ax, ay)^2} = 39.63$$

$$D(ax, ay) = \arctan\left(\frac{M_s(ax, ay)}{M_e(ax, ay)}\right) = 1.5614 \text{ rad}$$

For center pixel 14b:

$$Ms(bx, by) = \frac{45 + (2 \times 46) + 44 - 123 - (2 \times 125) - 124}{8}$$

$$= -39.50$$

$$Me(bx, by) = \frac{45 + (2 \times 83) + 123 - 44 - (2 \times 84) - 124}{8}$$

$$= -0.25$$

$$M(bx, by) = \sqrt{M_s(bx, by)^2 + M_e(bx, by)^2} = 39.50$$

$$D(bx, by) = \arctan\left(\frac{M_s(bx, by)}{M_e(bx, by)}\right) + \pi = -1.5771 \text{ rad}$$

For center pixel 14c:

$$Ms(cx, cy) = \frac{127 + (2 \times 125) + 126 - 47 - (2 \times 46) - 48}{8}$$

$$= 39.50$$

$$Me(cx, cy) = \frac{127 + (2 \times 86) + 48 - 126 - (2 \times 86) - 47}{8}$$

$$= 0.25$$

$$M(cx, cy) = \sqrt{M_s(cx, cy)^2 + M_e(cx, cy)^2} = 39.50$$

$$D(cx, cy) = \arctan\left(\frac{M_s(cx, cy)}{M_e(cx, cy)}\right) = 1.5645 \text{ rad}$$

In calculating Me(x,y)<0, π is added since the range of the arctangent of any angle is −π/2 to π/2. The gradient vector magnitude M(x,y) and direction D(x,y) values calculated for every center pixel are stored in the gradient vector buffer 11.

The edge detector 3 then determines whether a given image pixel is an edge pixel. For the center pixel 14a, the difference in intensity between the pixel "behind" the center pixel 14a and the pixel "in front of" it is determined as follows:

Mfa=23.13((0.7854−0.0094)/0.7854)+23.00(0.0094/0.7854)= 23.12<39.63

Mba=24.38((0.7854−0.0094)/0.7854)+23.87(0.0094/0.7854)= 24.38<39.63

The determination for center pixels 14*b* and 14*c* are similarly made. In the three example areas A–C, the center pixels defined in each may be considered edge pixels.

When the edge detector 3 does detect an edge pixel, it signals the rotator 4 to activate. If an edge pixel is not detected, the system 1 goes back to the gradient vector calculator 2 to select another pixel from the image space.

The rotator 4 when activated by the edge detector 3 accesses the balance operator 9. The balance operator 9 then calculates the positions and intensity magnitudes of the left and right pixels 15*l*, 15*r* as follows:

For center pixel 14*a*:

alx=ax+β sin (D(ax,ay))=ax+2 sin (1.5614)=ax+2.00 aly=ay+β cos (D(ax,ay))=ax+2 cos (1.5614)=ax+0.02

F(alx,aly)=(0.2×125)+(0.98×85)=85.80 arx=ax−β sin (D(ax,ay))=ax+2 sin (1.5614)=ax−2.00 ary=ay−β cos (D(ax,ay))=ax+2 cos (1.5614)=ax−0.02

F(arx,ary)=(0.02×46)+(0.98×85)=84.22

For center pixel 14*b*:

blx−bx+β sin (D(bx,by))=bx+2 sin (−1.5771)=bx−2.00 bly=by+β cos (D(bx,by))=bx+2 cos (−1.5771)=bx+0.01 brx=bx−β sin (D(bx,by))=bx+2 sin (−1.5771)=bx+2.00 bry=by−β cos (D(bx,by))=bx+2 cos (−1.5771)=bx−0.01

F(blx,bly)=(0.01×120)+(0.99×81)=81.39

F(brx,bry)=(0.01×42)+(0.99×80)=79.62

For center pixel 14*c*:

clx=cx+β sin (D(cx,cy))=cx+2 sin (1.5645)=cx+2.00 cly=cy+β cos (D(cx,cy))=cx+2 cos (1.5645)=cx+0.01 crx=cx−β sin (D(cx,cy))=cx+2 sin (1.5645)=cx−2.00 cry=cy−β cos (D(cx,cy))=cx+2 cos (1.5645)=cx−0.01

F(clx,cly)=(0.01×130)+(0.99×90)=90.40

F(crx,cry)=(0.01×51)+(0.99×89)=88.62

In the above example, the arm length distance value of β is 2.

The rotator 4 then uses the calculated intensities to determine the angle of modification R(F(lx,ly),F(rx,ry)) and the modified direction Dm(x,y) of the gradient vector as follows:

For the center pixel 14*a*:

R(F(alx,aly),F(arx,ary))=0.006×(85.80−84.22)=0.0095 rad

Dm(ax,ay)=1.5614+0.0095=1.5709 rad

For the center pixel 14*b*:

R(F(blx,bly),F(brx,bry))=0.006×(81.39−79.62)=0.0095 rad

Dm(bx,by)−1.5771+0.0095=−1.5670 rad

For the center pixel 14*c*:

R(F(blx,bly),F(brx,bry))0.006×(90.40−88.62)=0.0107 rad

Dm(cx,cy)=1.5614+0.0107=1.5721 rad

The modified direction Dm(x,y) is then stored in the gradient vector buffer 11 substituting for the direction D(x,y) originally calculated by the gradient vector calculator 2 for the image pixel being examined.

The circle edge detector 5 takes the gradient vector of the image pixel just modified to determine if it is a circle edge pixel. The circle edge detector accesses the balance operator 9 to determine left and right side pixels 15*l*, 15*r* based on the modified direction Dm(x,y) as shown below:

For the center pixel 14*a*:

alx=ax+β sin (Dm(ax,ay))=ax+2 sin(1.5709)=ax+2.00 aly=ay+β cos (Dm(ax,ay))=ax+2 cos(1.5709)=ax+0.00 arx=ax−β sin (Dm(ax,ay))=ax+2 sin(1.5709)=ax−2.00 ary=ay−β cos (Dm(ax,ay))=ax+2 cos(1.5709)=ax−0.00

F(alx,aly)=85.00

F(arx,ary)=85.00

For the center pixel 14*b*:

blx=bx+β sin (Dm(bx,by))=bx+2 sin (−1.5670)=bx+2.00 bly=bx+β cos (Dm(bx,by))=bx+2 cos (−1.5670)=bx−0.01 brx=bx−β sin (Dm(bx,by))=bx+2 sin (−1.5670)=bx−2.00 bry=by−β cos (Dm(bx,by))=bx+2 sin (−1.5670)=bx+0.01

F(blx,bly)=0.01×42+0.99×81=80.61

F(brx,bry)=0.01×120+0.99×80=80.40

For the center pixel 14*c*:

clx=cx+β sin (Dm(cx,cy))=cx+2 sin(1.5721)=cx+2.00 cly=cy+β cos (Dm(cx,cy))=cx+2 cos(1.5721)=cx+0.00 crx=cx−β sin (Dm(cx,cy))=cx+2 sin(1.5721)=cx−2.00 cry=cx−β cos (Dm(cx,cy))=cx+2 cos(1.5721)=cx−0.00

F(clx,cly)=90.00

F(crx,cry)=89.00

The circle edge detector 5 then determines the differences in intensities between the center pixel 14, the left side pixel 15*l* and the right side pixel 15*r*:

For the center pixel 14*a*:

Δl(ax,ay)=F(alx,aly)−F(ax,ay)=85.00−85.00=0.00

$$\Delta r(ax,ay)=F(arx,ary)-F(ax,ay)=85.00-85.00=0.00$$

$$\Delta s(ax,ay)=|F(alx,aly)-F(arx,ary)|=|85.00-85.00|=0.00$$

For the center pixel 14*b*:

$$\Delta l(bx,by)=F(blx,bly)-F(bx,by)=80.61-85.00=-4.39$$

$$\Delta r(bx,by)=F(brx,bry)-F(bx,by)=80.40-85.00=-4.60$$

$$\Delta s(bx,by)=|F(blx,bly)-F(brx,bry)|=|80.61-80.40|=0.21$$

For the center pixel 14*c*:

$$\Delta l(cx,cy)=F(clx,cly)-F(cx,cy)=90.00-85.00=5.00$$

$$\Delta r(cx,cy)=F(crx,cry)-F(cx,cy)=89.00-85.00=4.00$$

$$\Delta s(cx,cy)=|F(clx,cly)-F(crx,cry)|=|90.00-89.00|=1.00$$

As explained above, a circle edge pixel is detected when the intensity differences of a center pixel 14 with its associated left and right side pixels 15*l*, 15*r* satisfy the three difference conditions. For the three example center pixels 14*a*–14*c*, the following determinations are made with ThB=2.00 and ThM=3.00:

For the center pixel 14*a*:

$$\Delta s(ax,ay)=0.00<ThB$$

$$\Delta l(ax,ay)=0.00<ThM$$

$$\Delta r(ax,ay)=0.00<ThM$$

For the center pixel 14*b*:

$$\Delta s(bx,by)=0.21<ThB$$

$$\Delta l(bx,by)=-4.39<ThM$$

$$\Delta r(bx,by)=-4.60<ThM$$

For the center pixel 14*c*:

$$\Delta s(cx,cy)=1.00<ThB$$

$$\Delta l(cx,cy)=5.00>ThM$$

$$\Delta r(cx,cy)=4.00>ThM$$

Among the three examples, only the center pixel 14*c* satisfies all the conditions, and is therefore considered a circle edge pixel.

When the circle edge detector 5 does determine a circle edge pixel, it signals the circle center calculator 6 to activate.

The circle center calculator 6 then calculates the coordinates for the circle center. Using the example of center pixel 14*c*, the following coordinates are calculated:

$$Cx(cx,cy)=cx+30\times\cos(1.5721)=cx-0.04$$

$$Cy(cx,cy)=cy+30\times\sin(1.5721)=cy+30.00$$

In this example, the radius of the circle is set at $\delta=30$.

The circle center calculator 6 sends the coordinates for the circle center associated with the center pixel 14*c* in the accumulator 7.

The accumulator 7 stores the coordinates of the circle center 14*c* in the accumulator buffer 12. The system 1 at this point goes back to the gradient vector calculator 2 to select another pixel.

After all the pixels in the image space are scanned, the circle detector 8 uses the data on circle center coordinates in the accumulator buffer 11 to determine if a circle is present in the image space. If the cumulative frequency R(x,y) of a particular range of circle centers C(x,y) exceeds the threshold frequency of occurrence ThF, then that range of circle centers C(x,y) proves the existence of a circle in the image. In FIG. 3, Image 2 illustrates the image pixels from Image 0 that are determined to be circle center edge pixels, and the positions of the circle centers calculated for each circle edge pixel using the first embodiment of the invention.

Figure 7A:
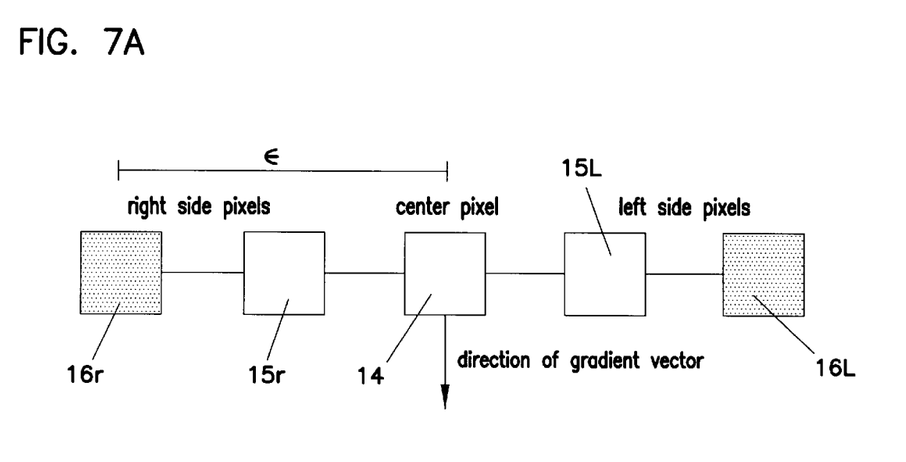
FIG. 7A shows the general position of the inner left and right side pixels and of the outer left and right side pixels relative to the center pixel used by the second embodiment of the invention.
Figure 7B:
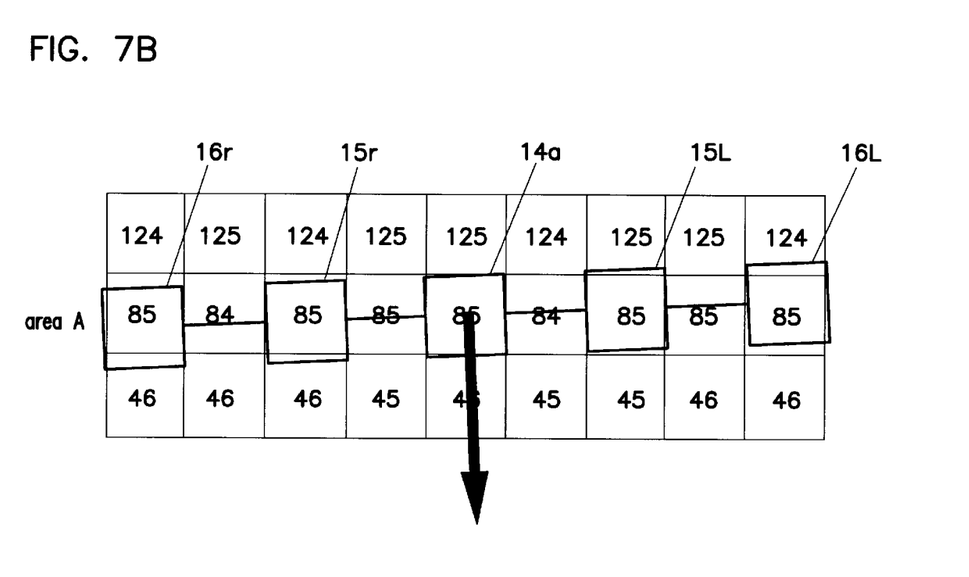
FIG. 7B shows the left and right side pixels relative to the neighborhood of pixels of area A.

In the above discussed first embodiment, the rotator 4 and the circle edge detector 5 access the balance operator 9 which applies left and right side pixels 15*l*, 15*r* at the same arm length distance $\beta$ to their separate operations. In a second embodiment of the invention, the balance operator 9 generates left and right side pixels 15*l*, 15*r* for the rotator 4 at an arm length distance $\beta$, and left and right side pixels 16*l*, 16*r* for the circle edge detector 5 at a different arm length distance $\epsilon$. This is illustrated in FIGS. 7A and 7B. Like $\beta$, the value of $\epsilon$ is based on the radius of the circle image to be detected, the width of the circle image line, and the color and the gray image level of the circle image. Its value is also inputted into the system prior to operation.

As will be shown below, using separate sets of side pixels for each operation results in a more accurate modification of a gradient vector by the rotator 4.

In this second embodiment, only the operations of the rotator 4, circle edge detector 5 and balance operator 9 are different from the first embodiment. Thus, only the operations of these three elements will be discussed. Elements in this embodiment similar to those in the first embodiment will be referred to with like reference numbers. In addition, calculations made for the first embodiment that are applicable will be used.

As in the first embodiment, the rotator 4 when activated by the edge detector 3 accesses the balance operator 9. The balance operator 9 then calculates the positions and intensity magnitudes of an inner pair of left and right pixels 15*l*, 15*r* as shown in FIGS. 7A and 7B. With an inside arm length $\beta=2$, the position and intensity values of the inner pair of side pixels 15*l*, 15*r* for the center pixels 14 are calculated as follows:

For the center pixel 14*a*:

$$alx=ax+\beta \sin(D(ax,ay))=ax+2\sin(1.5614)=ax+2.00$$

$$aly=ay+\beta \cos(D(ax,ay))=ax+2\cos(1.5614)=ax+0.02$$

$$arx=ax-\beta \sin(D(ax,ay))=ax+2\sin(1.5614)=ax-2.00$$

$$ary=ax-\beta \cos(D(ax,ay))=ax+2\cos(1.5614)=ax-0.02$$

$$F(alx,aly)=(0.02\times125)+(0.98\times85)=85.80$$

$$F(arx,ary)=(0.02\times46)+(0.98\times85)=84.22$$

For the center pixel 14*b*:

$$blx=bx+\beta \sin(D(bx,by))=bx+2\sin(-1.5771)=bx-2.00$$

$$bly=bx+\beta \cos(D(bx,by))=bx+2\cos(-1.5771)=bx+0.01$$

$$brx=bx-\beta \sin(D(bx,by))=bx+2\sin(-1.5771)=bx+2.00$$

$$bry=by-\beta \cos(D(bx,by))=bx+2\cos(-1.5771)=bx-0.01$$

$$F(blx,bly)=(0.01\times120)+(0.99\times81)=81.39$$

$$F(brx,bry)=(0.01\times42)+(0.99\times80)=79.62$$

For the center pixel 14c:

$$clx = cx + \beta \sin(D(cx,cy)) = cx + 2 \sin(1.5645) = cx + 2.00$$

$$cly = cy + \beta \cos(D(cx,cy)) = cx + 2 \cos(1.5645) = cx + 0.01$$

$$crx = cx - \beta \sin(D(cx,cy)) = cx + 2 \sin(1.5645) = cx - 2.00$$

$$cry = cx - \beta \cos(D(cx,cy)) = cx + 2 \cos(1.5645) = cx - 0.01$$

$$F(clx,cly) = (0.01 \times 130) + (0.99 \times 90) = 90.40$$

$$F(crx,cry) = (0.01 \times 51) + (0.99 \times 89) = 88.62$$

The rotator 4 then uses the calculated intensities to determine the angle of modification R(F(lx,ly),F(rx,ry)) and the modified direction Dm(x,y) of the gradient vector as follows:

For the center pixel 14a:

$$R(F(alx,aly), F(arx,ary)) = 0.006 \times (85.80 - 84.22) = 0.0095 \text{ rad}$$

$$Dm(ax,ay) = 1.5614 + 0.0095 = 1.5670 \text{ rad}$$

For the center pixel 14c:

$$R(F(blx,bly), F(brx,bry)) = 0.006 \times (81.39 - 79.62) = 0.0095 \text{ rad}$$

$$Dm(bx,by) = 1.5771 + 0.0095 = 1.5670 \text{ rad}$$

For the center pixel 14c:

$$R(F(clx,cly), F(crx,bry)) = 0.006 \times (90.40 - 88.62) = 0.0107 \text{ rad}$$

$$Dm(cx,cy) = 1.5614 + 0.0107 = 1.5721 \text{ rad}$$

The modified direction Dm(x,y) is then stored in the gradient vector buffer 11 substituting for the direction D(x,y) originally calculated by the gradient vector calculator 2 for the image pixel being examined.

The circle edge detector 5 takes the gradient vector of the image pixel just modified to determine if it is a circle edge pixel. The circle edge detector accesses the balance operator 9 to determine outer left and right side pixels 16*l*, 16*r* as shown in FIGS. 7A–7B based on the modified direction Dm(x,y) as shown below:

For the center pixel 14a:

$$alx = ax + \beta \sin(Dm(ax,ay)) = ax + 4 \sin(1.5709) = ax + 4.00$$

$$aly = ay + \beta \cos(Dm(ax,ay)) = ax + 4 \cos(1.5709) = ax + 0.00$$

$$arx = ax - \beta \sin(Dm(ax,ay)) = ax + 4 \sin(1.5709) = ax - 4.00$$

$$ary = ay - \beta \cos(Dm(ax,ay)) = ax + 4 \cos(1.5709) = ax - 0.00$$

$$F(alx, aly) = 85.00$$

$$F(arx, ary) = 85.00$$

For the center pixel 14b:

$$blx = bx + \beta \sin(Dm(bx,by)) = bx + 4 \sin(-1.5670) = bx + 4.00$$

$$bly = bx + \beta \cos(Dm(bx,by)) = bx + 4 \cos(-1.5670) = bx - 0.02$$

$$brx = bx - \beta \sin(Dm(bx,by)) = bx + 4 \sin(-1.5670) = bx - 0.02$$

$$bry = by - \beta \cos(Dm(bx,by)) = bx + 2 \sin(-1.5670) = bx + 0.01$$

$$F(blx,bly) = (0.02 \times 35) + (0.98 \times 73) = 72.24$$

$$F(brx,bry) = (0.02 \times 112) + (0.98 \times 80) = 72.80$$

For the center pixel 14c:

$$clx = cx + \beta \sin(Dm(cx,cy)) = cx + 4 \sin(1.5721) = cx + 4.00$$

$$cly = cy + \beta \cos(Dm(cx,cy)) = cx + 4 \cos(1.5721) = cx + 0.01$$

$$crx = cx - \beta \sin(Dm(cx,cy)) = cx + 4 \sin(1.5721) = cx - 4.00$$

$$cry = cy - \beta \cos(Dm(cx,cy)) = cx + 4 \cos(1.5721) = cx - 0.01$$

$$F(clx,cly) = (0.01 \times 60) + (0.99 \times 101) = 100.59$$

$$F(crx,cry) = (0.01 \times 145) + (0.99 \times 100) = 100.45$$

In this example, the arm length E to the outside pair of side pixels is 4.

The circle edge detector 9 then determines the differences in intensities between the center pixel 14, the left side pixel 16*l* and the right side pixel 16*r*:

For the center pixel 14a:

$$\Delta l(ax,ay) = F(alx,aly) - F(ax,ay) = 85.00 - 85.00 = 0.00$$

$$\Delta l(ax,ay) = F(arx,ary) - F(ax,ay) = 85.00 - 85.00 = 0.00$$

$$\Delta s(ax,ay) = |F(alx,aly) - F(arx,ary)| = |85.00 - 85.00| = 0.00$$

For the center pixel 14b:

$$\Delta l(bx,by) = F(blx,bly) - F(bx,by) = 72.24 - 85.00 = -7.76$$

$$\Delta r(bx,by) = F(brx,bry) - F(bx,by) = 72.80 - 85.00 = -7.20$$

$$\Delta s(bx,by) = |F(blx,bly) - F(brx,bry)| = |72.24 - 72.24| = 0.54$$

For the center pixel 14c:

$$\Delta l(bx,by) = F(blx,bly) - F(bx,by) = 100.59 - 85.00 = 14.41$$

$$\Delta r(bx,by) = F(brx,bry) - F(bx,by) = 100.45 - 85.00 = 14.55$$

$$\Delta s(bx,by) = |F(blx,bly) - F(brx,bry)| = |100.59 - 100.45| = 0.14$$

In this embodiment, a circle edge pixel is also detected when the intensity differences of a center pixel 14 with its associated outer left and right side pixels 16*l*, 16*r* satisfy the three difference conditions. For the three example center pixels 14a–14c, the following determinations are made:

For the center pixel 14a:

$$\Delta s(ax,ay) = 0.00 < 1.00$$

$$\Delta l(ax,ay) = 0.00 < 10.00$$

$$\Delta r(ax,ay) = 0.00 < 10.00$$

For the center pixel 14b:

$$\Delta s(bx,by) = 0.54 < 1.00$$

$$\Delta l(bx,by) = -7.766 < 10.00$$

$$\Delta r(bx,by) = -7.20 < 10.00$$

For the center pixel 14c:

$\Delta s(cx,cy)=0.14<1.00$ $\Delta l(cx,cy)=14.41>10.00$ $\Delta r(cx,cy)=14.55>10.00$ In this second embodiment, ThB=1.00 and ThM=10.00. As with the first example, only the center pixel 14c satisfies all the conditions, and is therefore considered a circle edge pixel.

At this point, the operation of the second embodiment is the same as in the first embodiment.

As discussed earlier, this second embodiment obtains more accurate modifications of a gradient vector's direction by the rotator 4. Setting the arm length β smaller to make the gradient vector magnitude of the inner side pixels larger has been found to make the calculated differences between the inner side pixel values sensitive to the modification by the rotator 4.

In the operation of the circle edge detector 5, setting the arm length ε greater than the arm length β to make the gradient vector magnitude of the outer side pixels smaller makes the calculated differences between the center pixel intensity and outer side pixel intensities insensitive to digitalization and rotation. The values for the threshold ThM may therefore be set higher and ThB smaller. Using these threshold values eliminates edge pixels that are not circle edge pixels. In FIG. 3, Image 4 illustrates the results of using the second embodiment of the invention. Using two sets of left and right side pixels at different arm length distances is more accurate than using only one arm length distance.

In a third embodiment of the invention, the operation of the rotator 4 is eliminated. After the edge detector 3 detects an edge pixel, the circle edge detector 5 is activated to determine the differences in intensities between the center pixel, the left side pixel 15l and the right side pixel 15r. The circle edge detector 5 accesses the balance operator 9 to determine positions and intensity magnitudes for left and right side pixels 15l, 15r based on the original gradient vectors:

For center pixel 14a:

$alx=ax+\beta \sin(D(ax,ay))=ax+2 \sin(1.5614)=ax+2.00$ $aly=ay+\beta \cos(D(ax,ay))=ax+2 \cos(1.5614)=ax+0.02$ $F(alx,aly)=(0.2\times125)+(0.98\times85)=\mathbf{85.80}$ $arx=ax-\beta \sin(D(ax,ay))=ax+2 \sin(1.5614)=ax-2.00$ $ary=ay-\beta \cos(D(ax,ay))=ax+2 \cos(1.5614)=ax-0.02$ $F(arx,ary)=(0.02\times46)+(0.98\times85)=84.22$ For center pixel 14b:

$blx=bx+\beta \sin(D(bx,by))=bx+2 \sin(-1.5771)=bx-2.00$ $bly=by+\beta \cos(D(bx,by))=bx+2 \cos(-1.5771)=bx+0.01$ $brx=bx-\beta \sin(D(bx,by))=bx+2 \sin(-1.5771)=bx+2.00$ $bry=by-\beta \cos(D(bx,by))=bx+2 \cos(-1.5771)=bx-0.01$ $F(blx,bly)=(0.01\times120)+(0.99\times81)=81.39$ $F(brx,bry)=(0.01\times42)+(0.99\times80)=79.62$ For center pixel 14c:

$clx=cx+\beta \sin(D(cx,cy))=cx+2 \sin(1.5645)=cx+2.00$ $cly=cy+\beta \cos(D(cx,cy))=cx+2 \cos(1.5645)=cx+0.01$ $crx=cx-\beta \sin(D(cx,cy))=cx+2 \sin(1.5645)=cx-2.00$ $cry=cy-\beta \cos(D(cx,cy))=cx+2 \cos(1.5645)=cx-0.01$ $F(clx,cly)=(0.01\times130)+(0.99\times90)=90.40$ $F(crx,cry)=(0.01\times51)+(0.99\times89)=88.62$ In this example, the arm length distance value of β is 2.

As done in the first two embodiments, the circle edge detector 5 determines the differences in intensities between the center pixel 14, the left side pixel 15l and the right side pixel 15r:

For the center pixel 14a:

$\Delta l(ax,ay)=F(alx,aly)-F(ax,ay)=85.80-85.00=0.80$ $\Delta r(ax,ay)=F(arx,ary)-F(ax,ay)=84.22-85.00=-0.78$ $\Delta s(ax,ay)=|F(alx,aly)-F(arx,ary)|=|85.80-84.22|=1.58$ For the center pixel 14b:

$\Delta l(bx,by)=F(blx,bly)-F(bx,by)=81.39-85.00=-3.61$ $\Delta r(bx,by)=F(brx,bry)-F(bx,by)=79.62-85.00=-5.38$ $\Delta s(bx,by)=|F(blx,bly)-F(brx,bry)|=|81.39-79.62|=1.77$ For the center pixel 14c:

$\Delta l(cx,cy)=F(clx,cly)-F(cx,cy)=90.40-85.00=5.40$ $\Delta r(cx,cy)=F(crx,cry)-F(cx,cy)=88.62-85.00=3.62$ $\Delta s(cx,cy)=|F(clx,cly)-F(crx,cry)|=|90.40-88.62|=1.78$ When the three difference conditions are applied to the intensity differences for the three example center pixels 14a–14c, the following determinations are made with ThB=2.00 and ThM=3.00:

For the center pixel 14a:

$\Delta s(ax,ay)=1.58<ThB$ $\Delta l(ax,ay)=0.80<ThM$ $\Delta r(ax,ay)=-0.78<ThM$ For the center pixel 14b:

$\Delta s(bx,by)=1.77<ThB$ $\Delta l(bx,by)=-3.61<ThM$ $\Delta r(bx,by)=-5.38<ThM$ For the center pixel 14c:

$\Delta s(cx,cy)=1.78<ThB$ $\Delta l(cx,cy)=5.40>ThM$

Δr(cx,cy)=3.62>ThM

Among the three examples, only the center pixel 14c again satisfies all the conditions, and is therefore considered a circle edge pixel.

Like the second embodiment, the operation of the third embodiment at this point is the same as in the first embodiment.

This third embodiment as stated earlier removes the operation of the rotator 4. As a result, the determination of the left and right side pixels is less accurate. The calculations made by this third embodiment are, however, simpler and therefore take less time than either the first or second embodiments. In FIG. 3, Images 1 and 3 illustrate the results of using the third embodiment. In Image 1, the arm length distance value β was used similar to the operation of the first embodiment. In Image 3, left and right side pixels were generated using the arm length distance value ε similar to the second embodiment.

Modifications and variations of the above-described embodiments of the present invention are possible, as will be appreciated by those skilled in the art in light of the above teachings. For example, the scanner device 102 can include a scanner such as a Ricoh IS-50, a video camera, an x-ray photographing device, an infrared photographing device, or an ultraviolet photographing device. In general, any device that can output a gray image may provide the input data image for the invention. In addition, there are numerous applications for the method and system of the present invention described above. Examples of applications for the invention include seal detection, logo recognition, map or drawing recognition, aerial photograph interpretation, and chest radiography.

Further, other methods or variations of the methods described may be substituted for different aspects of the invention. For example, other techniques known in the art for detecting an edge pixel, for determining a circle based on the data provided, etc., may be used without departing from the scope of the invention It is therefore to be understood that, within the scope of the appended claims and their equivalents, the invention may be practiced otherwise than as specifically described.

What is claimed is:

1. A method for detecting a predetermined sized circle in an image being scanned with an image analyzing and pattern recognition system, comprising the steps of:

(a) determining whether a pixel in an image being scanned is an edge pixel;

(b) determining a gradient vector associated with said edge pixel based upon an intensity of said edge pixel and on intensities of a predetermined number of pixels near said edge pixel;

(c) modifying at least a direction of said gradient vector based upon the intensity of a pair of pixels located perpendicularly to said gradient vector and at a predetermined distance from said edge pixel, said pair of pixels having a substantially similar intensity value;

(d) determining whether said edge pixel has a lower intensity value than that of said pair of pixels, said edge pixel with the lower intensity value defining a circle edge pixel;

(e) determining coordinates of a center of the predetermined sized circle based upon said circle edge pixel and said modified gradient vector;

(f) storing said coordinates in memory;

(g) repeating steps (a)–(f) for each of a plurality of pixels in the image being scanned;

(h) determining whether said coordinates of said center of said predetermined sized circle for said circle edge pixel are the same as other sets of said coordinates for other ones of said circle edge pixel; and (i) detecting a circle defined by said circle edge pixels having said centers within a predetermined range of each other.

2. A method for detecting a predetermined sized circle in an image being scanned as claimed in claim 1, wherein said step (b) of determining a gradient vector for said edge pixel includes the steps of:

deriving illumination intensity values for said edge pixel and a neighborhood of pixels adjacent to and surrounding said edge pixel, arranging the illumination intensity values in a matrix representative of said edge pixel and said neighborhood of pixels, and applying a Sobel operator to said matrix to generate said gradient vector for said edge pixel.

3. A method for detecting a predetermined sized circle in an image being scanned as claimed in claim 1, wherein said step (c) of modifying at least a direction of said gradient vector includes the steps of:

generating left and right side pixel intensity values and coordinates representative of left and right side pixels each located at a predetermined distance from said edge pixel and along an axis orthogonal to said gradient vector of said edge pixel, determining a rotation value with which to modify the direction of the gradient vector based on said left and right side pixel intensity values and coordinates, and deriving a modified direction of the gradient vector directed toward the center of a circle incorporating said edge pixel.

4. A method for detecting a predetermined sized circle in an image being scanned as claimed in claim 3, wherein said step (d) of determining whether said edge pixel has a lower intensity than that of said pair of pixels includes the steps of:

calculating a difference in intensity values between said edge pixel and each of said left and right side pixels, calculating a difference in intensity values between said left side pixel and said right side pixel, and determining whether said edge pixel is a circle edge pixel based on said calculated intensity value differences.

5. A method for detecting a predetermined sized circle in an image being scanned as claimed in claim 1, wherein said step (c) of modifying at least a direction of said gradient vector includes the steps of:

generating first left and right side pixel intensity values and coordinates representative of first left and right side pixels each located at a predetermined inner distance from said edge pixel and along an axis orthogonal to said gradient vector of said edge pixel, determining a rotation value with which to modify the direction of the gradient vector based on said first left and right side pixel intensity values and coordinates, and deriving a modified direction of the gradient vector directed toward the center of a circle incorporating said edge pixel.

6. A method for detecting a predetermined sized circle in an image being scanned as claimed in claim 5, wherein step (d) of determining whether said edge pixel has a lower intensity than that of said pair of pixels includes the steps of:

generating second left and right side pixel intensity values and coordinates representative of second left and right side pixels each located at a predetermined outer distance from said edge pixel and along an axis orthogonal to said gradient vector of said edge pixel, calculating a difference in intensity values between said edge pixel and each of said second left and right side pixels, calculating a difference in intensity values between said second left side pixel and said right side pixel, and determining whether said edge pixel is a circle edge pixel based on said calculated intensity value differences.

7. A method for detecting a predetermined sized circle in an image being scanned as claimed in claim 1, wherein said step (d) of determining whether said edge pixel has a lower intensity than that of said pair of pixels includes the steps of:

determining whether circle edge pixels have calculated centers within a predetermined range of each other, and determining whether circle edge pixels having calculated centers within a predetermined range of each other has a frequency of occurrence that exceeds a predetermined minimum frequency of occurrence.

8. A method for detecting a predetermined sized circle in an image being scanned as claimed in claim 1, further comprising additional steps of:

(j) determining said coordinates for each of a plurality of pixels in the image being scanned;

(k) determining whether said coordinates of said calculated center of a hypothetical circle are substantially identical for said circle edge pixel; and (l) detecting an actual circle defined by said circle edge pixels if said coordinates are within a predetermined range of deviation.

9. A method for detecting a predetermined sized circle in an image being scanned with an image analyzing the pattern recognition system, comprising the steps of:

(a) determining whether a pixel in an image being scanned is an edge pixel;

(b) determining a gradient vector associated with said edge pixel based on an intensity of said edge pixel and on intensities of a predetermined number of pixels near said edge pixel, said predetermined number of pixels having a substantially similar intensity value;

(c) determining whether said edge pixel has a lower intensity value than that of said predetermined number of pixels, said edge pixel with the lower intensity value defining a circle edge pixel;

(d) determining coordinates of a center of a predetermined sized circle based upon said circle edge pixel and said gradient vector;

(e) repeating steps (a)–(d) for each of a plurality of pixels in the image being scanned;

(f) determining whether said coordinates of said center of said predetermined sized circle for said circle edge pixel are the same as other sets of said coordinates for other ones of said circle edge pixel; and (g) detecting a circle defined by said circle edge pixels having said centers within a predetermined range of each other.

10. A method for detecting a predetermined sized circle in an image being scanned as claimed in claim 9, further comprising the additional steps of:

(h) determining said coordinates for each of a plurality of pixels in the image being scanned;

(i) determining whether said coordinates of said center of said circle are substantially identical for said circle edge pixel; and (j) detecting a circle defined by said circle edge pixels if said coordinates are within a predetermined range of deviation.

11. A system for detecting a predetermined sized circle in a gray image being scanned by an image detecting and analyzing device, the device detecting and analyzing individual pixels in the gray image, said system comprising:

a gradient vector calculator for calculating for calculating a gradient vector for each pixel in a gray image being scanned, said gradient vector calculator including a gradient vector buffer for storing data on said gradient vector;

an edge detector that determines whether each pixel in the gray image being scanned is an edge pixel based upon intensities of a predetermined number of pixels near said edge pixel;

a rotator in response to said edge detector to modify a direction of said gradient vector based upon the intensity of a pair of pixels located perpendicularly to said gradient vector and at a predetermined distance from said edge pixel, said pair of pixels having a substantially similar intensity value;

a circle edge detector connected to said rotator to determine whether said edge pixel has a lower intensity value than that of said pair of pixels, said edge pixel with the lower intensity value defining a circle edge pixel;

a circle center calculator in response to said circle edge detector to calculate a center of the predetermined sized circle based upon said circle edge pixel and said modified gradient vector;

an accumulator connected to said circle center calculator to store data on the calculated circle center, said accumulator including an accumulator buffer; and a circle detector connected to said accumulator to determine whether a circle is present in the gray image being scanned based on the data on the calculated circle centers in said accumulator.

12. A system for detecting a predetermined sized circle in a gray image as claimed in claim 11, further comprising:

a balance operator accessed by said rotator and that generates position and illumination intensity data on left and right side pixels positioned relative to the image pixel being scanned, said balance operator further determining modification data for said rotator to modify the gradient vector direction of the image pixel being scanned based on the position and illumination intensity data.

13. A system for detecting a predetermined sized circle in a gray image as claimed in claim 12, wherein said balance operator is further accessed by said circle edge detector to generate illumination intensity difference data on left and right side pixels positioned relative to the image pixel being scanned and on the image pixel, said circle edge detector determining whether an image pixel is a circle edge pixel based on the illumination intensity difference data.

14. A system for detecting a predetermined sized circle in a gray image being scanned by an image detecting and analyzing device, the device detecting and analyzing individual pixels in the gray image, said system comprising:

a gradient vector calculator that calculates a gradient vector for each pixel in a gray image being scanned, said gradient vector calculator including a gradient vector buffer for storing data on calculated gradient vectors;

an edge detector that determines whether each pixel in the gray image being scanned is an edge pixel based upon intensities of a predetermined number of pixels near said edge pixel;

a circle edge detector that determines whether said edge pixel has a lower intensity value than that of said predetermined number of pixels which have a substantially similar intensity value, said edge pixel with the lower intensity value defining a circle edge pixel;

a circle center calculator activated by said circle edge detector to calculate a center of the predetermined sized circle based upon said circle edge pixel and said gradient vector;

an accumulator connected to said circle center calculator to store data on calculated circle centers, said accumulator including an accumulator buffer; and a circle detector connected to said accumulator to determine whether a circle is present in the gray image being scanned based on the data on calculated circle centers in said accumulator.

15. A system, for detecting a predetermined sized circle in a gray image as claimed in claim 14, further comprising:

a balance operator accessed by said circle edge detector and that generates position and illumination intensity data on left and right side pixels positioned relative to the image pixel being scanned, said balance operator being further accessed by said circle edge detector to generate illumination intensity difference data on left and right side pixels positioned relative to the image pixel being scanned and on the image pixel, said circle edge detector determining whether an image pixel is a circle edge pixel based on the illumination intensity difference data.

* * * * *